Oct. 9, 1962 A. DUBETZ ETAL 3,057,389
HIGH SPEED TIRE
Filed Feb. 25, 1960 2 Sheets-Sheet 1

United States Patent Office 3,057,389
Patented Oct. 9, 1962

3,057,389
HIGH SPEED TIRE
Alex Dubetz, Akron, and Richard D. Van Arnam, Wadsworth, Ohio, assignors to The Firestone Tire & Rubber Company, Akron, Ohio, a corporation of Ohio
Filed Feb. 25, 1960, Ser. No. 11,089
2 Claims. (Cl. 152—210)

This invention relates to pneumatic tires and more particularly to means for reinforcing pneumatic tires against the forces of separation and chunking out at high speeds.

In such tires as passenger and airplane tires, a problem in tire design is to construct a tire casing and tread which have sufficient strength to resist delamination and breaking up when rotated at high speed. At such times in operation of the tire, heat is generated and the fabric and rubber of the tire weaken to throw off pieces of rubber or otherwise disintegrate.

The present invention provides a tire having high strength, not only under normal operating conditions but under operating conditions encountered in high speed service.

It is, therefore, an object of the invention to provide a tire having resistance to forces tending to disintegrate it at high speeds.

Another object of the invention is to provide a high speed tire having rubber plies in which are embedded short parallel lengths of textile material. A further object is to provide a tire designed for high speed service having a tread in which are embedded short parallel lengths of textile material.

These and other objects are attained by embedding short parallel lengths of textile material in rubbery plies and embedding the plies between the tread and fabric body portion of a tire. In a modification of the invention, short lengths of textile are embedded in parallel relation in the tire tread. In yet another modification of the invention, alternate layers of parallel textile lengths are embedded in the tire tread with the textile lengths of each layer crossing the textile lengths of the adjacent layers.

These and other objects of the invention may be more readily understood with reference to the attached drawings of which:

Figure 1:
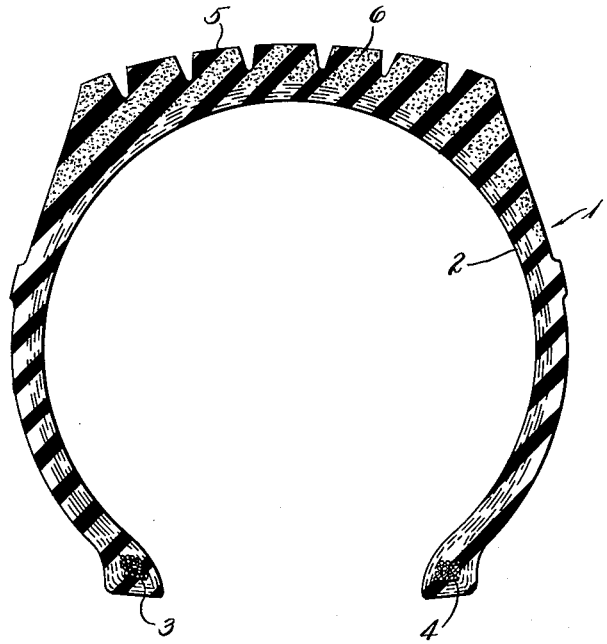
FIG. 1 is a sectional view of a tire constructed in accordance with the invention.

Referring to FIGURE 1, a pneumatic tire generally indicated at 1 comprises a conventional body portion 2 made up of sheets of textile material lying in side by side relation and folded at each edge about circular, inextensible beads 3 and 4. Superimposed upon and bonded to the body portion 2 is a vulcanized rubbery tread portion 5.

Figure 2:
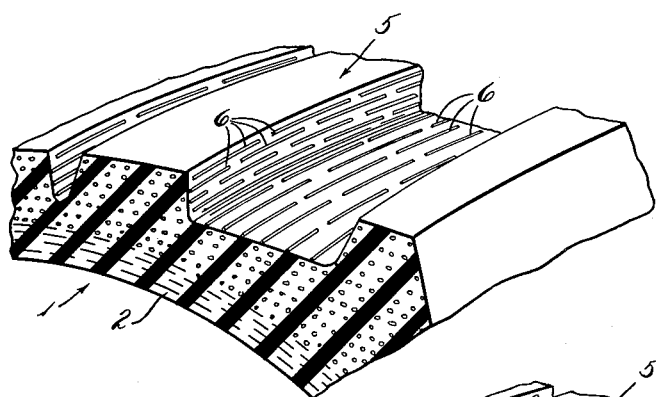
FIG. 2 is an enlarged fragmentary sectional view of the tread portion of the tire of FIG. 1.

The tread 5 differs from a conventional tire tread in that short lengths of textile material 6 (FIG. 2) are embedded throughout the body thereof in spaced parallel relation. The textile elements 6 are from ½ inch to 3 inches in length with lengths of from 1 to 2 inches preferred. This material may be cotton or synthetic textile materials such as polyamide, polycaprolactam, polyethylene or cellulosic materials such as rayon. The preferred textile material is polyamide.

Figure 3:
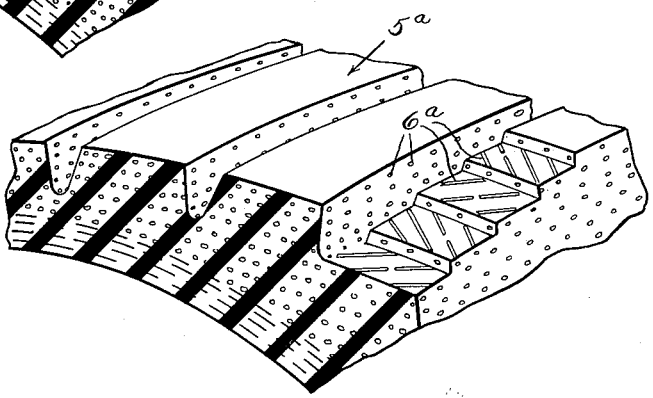
FIG. 3 is a view similar to FIG. 2 showing one modification of the invention.

Referring to FIG. 3, the textile elements 6a are shown arranged in the tread 5a in alternating plied criss-cross relation. This arrangement permits the textile elements to cooperate to even a greater extent to strengthen and reinforce the tire. Such an arrangement of textile elements in the tread may be attained by forming the tread of alternate plies of unvulcanized tread rubber having the textile elements arranged at an angle to the long axis of the strip. When the tire is molded the rubbery plies flow together, but the textile elements are in layers which criss-cross each other and extend from the base to the cap of the tread.

Figure 4:
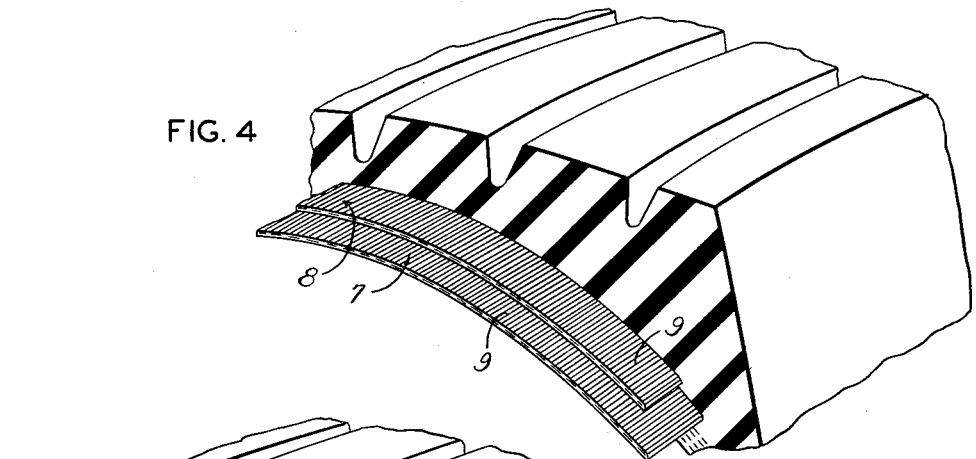
FIGS. 4, 5 and 6 are views similar to FIGS. 2 and 3 showing yet further modifications of the invention.

In the modification of the invention shown in FIG. 4, the tread and fabric body portion are separated by plies 7 and 8 having textile elements 9 so arranged to lie circumferentially around the tire. These elements may be arranged circumferentially, for example, by placing them in a batch of unvulcanized rubber stock being broken down on a calender feed mill. When the stock is run through a calender to form a sheet, a so-called "grain" is formed in the sheet. In other words, any particles present in the rubber line up along the length of the sheet. Thus, the textile elements line up lengthwise with the calendered sheet so that strips of rubber may be cut therefrom to form the plies 7 and 8. Tires built having plies with textile elements running in the circumferential direction have greater strength and resist the outward throw of centrifugal force to a greater degree than do conventional tires.

Figure 5:
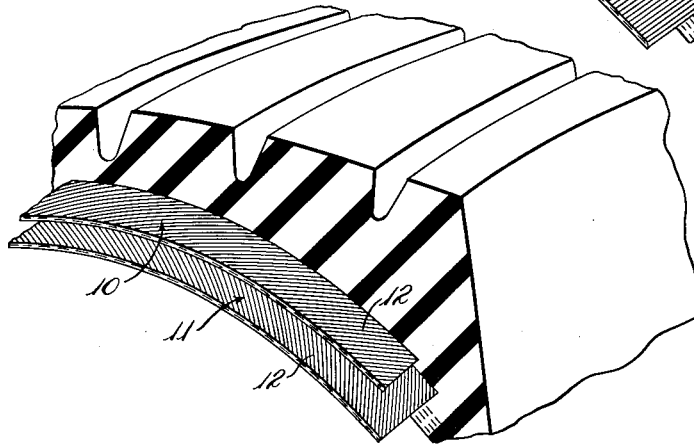

In the modification of the invention shown in FIG. 5, two plies 10 and 11 have embedded therein textile elements such as 12 which cross each other. Although only two plies are shown, this modification of the invention includes the use of two or more plies, the only requirement being that alternate plies have textile elements crossing each other at equal angles with an imaginary circumferential line about the tire.

Figure 6:
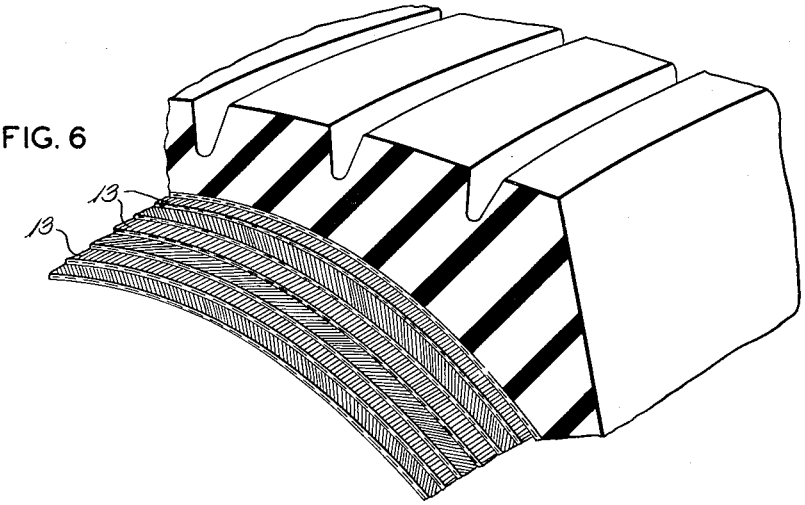

In the modification of the invention shown in FIG. 6, a number of rubbery sheets of short textile elements 13 oriented circumferentially about the tire are interposed between plies having short textile elements arranged at an angle to each other. This reinforcing arrangement gives the tire strength to resist separation at high speed operation.

The angle at which the short textile elements cross a circumferential line on the crown of the tire varies from 0° to 90°. It will be seen that this construction covers a range of alternate ply arrangements where the textile elements of separate plies are parallel to each other and the tire axis, all the way to that arrangement where the textile elements of different plies are parallel to each other and to a circumferential line on the crown of the tire. The important feature of the invention is that a substantial number of textile elements in each ply be parallel to each other and not dispersed in a random manner. The parallel elements sustain each other and together add strength to the rubber ply without the added weight which would be present if a complete fabric sheet had been used. Further, the use of the individual elements provides strength with less mass than that provided by a fabric sheet so that the the heat generated in a tire using the novel construction is less than that of a tire using a fabric sheet.

If desired, in order to improve adhesion of the textile elements to the rubber in which they are encased, those elements may be dipped in a rubber-to-textile adhesion promoting dip.

What is claimed is:

1. In a pneumatic tire comprising a rubbery tread portion overlying and bonded to a rubberized fabric body portion the improvement that said tread portion is composed of a bonded together plurality of successive rubber layers containing embedded throughout discontinuous, discrete textile fibers of a length of from 0.5 to 3 inches, the textile fibers in any given one of said layers being oriented in substantially one direction.

2. A pneumatic tire according to claim 1 wherein the orientations of said textile fibers of adjacent rubber layers are criss-crossed and the orientations of said textile fibers of alternate rubber layers are substantially the same.

References Cited in the file of this patent

UNITED STATES PATENTS

| | | |
|---|---|---|
| 1,117,994 | Freeman | Nov. 24, 1914 |
| 1,629,517 | Marshall | May 24, 1927 |
| 1,689,119 | Evans | Oct. 23, 1928 |
| 1,894,237 | Mallory | Jan. 10, 1933 |
| 2,013,553 | Day | Sept. 3, 1935 |
| 2,056,012 | Madge et al. | Sept. 29, 1936 |
| 2,225,042 | Elliott | Dec. 17, 1940 |
| 2,541,506 | Cuthbertson et al. | Feb. 13, 1951 |
| 2,943,663 | Antonson | July 5, 1960 |
| 2,945,525 | Lugli | July 19, 1960 |

FOREIGN PATENTS 1,153,791 France _____ Oct. 14, 1957
(U.S. corresponding Patent No. 2,937,684, May 24, 1960)

OTHER REFERENCES

Continental German application 1,029,693, published May 8, 1958 (B 62 g).